United States Patent
Lohr et al.

(10) Patent No.: US 10,229,784 B2
(45) Date of Patent: Mar. 12, 2019

(54) RECHARGEABLE HAND TOOL BATTERY

(71) Applicant: Robert Bosch GmbH, Stuttgart (DE)

(72) Inventors: Guenter Lohr, Leinfelden-Echterdingen (DE); Dragan Krupezevic, Stuttgart (DE); Juergen Mack, Goeppingen (DE); Jan Breitenbach, Stuttgart (DE); Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 156 days.

(21) Appl. No.: 14/653,711

(22) PCT Filed: Dec. 18, 2013

(86) PCT No.: PCT/EP2013/077140
§ 371 (c)(1),
(2) Date: Jun. 18, 2015

(87) PCT Pub. No.: WO2014/096034
PCT Pub. Date: Jun. 26, 2014

(65) Prior Publication Data
US 2015/0333559 A1    Nov. 19, 2015

(30) Foreign Application Priority Data

Dec. 21, 2012 (DE) .......... 10 2012 112 846
Feb. 1, 2013 (DE) .......... 10 2013 201 706
Dec. 17, 2013 (DE) .......... 10 2013 226 247

(51) Int. Cl.
*H02J 7/00* (2006.01)
*H01F 38/14* (2006.01)
(Continued)

(52) U.S. Cl.
CPC .......... *H01F 38/14* (2013.01); *H01M 2/1022* (2013.01); *H01M 2/1055* (2013.01);
(Continued)

(58) Field of Classification Search
CPC .................. H01F 38/14; H01M 2/1022; H02J 50/00–50/90
(Continued)

(56) References Cited

U.S. PATENT DOCUMENTS

| | | | |
|---|---|---|---|
| 2009/0121677 A1* | 5/2009 | Inoue | H02J 50/10 320/108 |
| 2009/0237194 A1* | 9/2009 | Waffenschmidt | H01F 27/2804 336/115 |
| 2013/0088191 A1* | 4/2013 | Sutarwala | H02J 5/005 320/108 |
| 2013/0307472 A1* | 11/2013 | Rejman | B25H 3/02 320/108 |

(Continued)

FOREIGN PATENT DOCUMENTS

| | | |
|---|---|---|
| CN | 101681719 A | 3/2010 |
| CN | 101842921 A | 9/2010 |

(Continued)

OTHER PUBLICATIONS

International Search Report for PCT/EP2013/077140, dated Jun. 25, 2014.

*Primary Examiner* — Zixuan Zhou
(74) *Attorney, Agent, or Firm* — Norton Rose Fulbright US LLP; Gerard Messina

(57) ABSTRACT

A rechargeable handheld tool battery includes: at least one rechargeable cell; and at least one inductive charging unit that has at least one inductive charging coil for charging the at least one rechargeable cell. A diameter of the inductive charging coil is greater than a principal extension length of the at least one rechargeable cell.

15 Claims, 12 Drawing Sheets

(51) Int. Cl.
*H02J 7/02* (2016.01)
*H02J 50/10* (2016.01)
*H01M 2/10* (2006.01)
*H01M 10/46* (2006.01)

(52) U.S. Cl.
CPC ........... *H01M 10/46* (2013.01); *H02J 7/0042* (2013.01); *H02J 7/0044* (2013.01); *H02J 7/0045* (2013.01); *H02J 7/0052* (2013.01); *H02J 7/025* (2013.01); *H02J 7/027* (2013.01); *H02J 50/10* (2016.02); *H01M 2220/30* (2013.01)

(58) Field of Classification Search
USPC ........................ 307/104; 320/108, 112–115
See application file for complete search history.

(56) References Cited

U.S. PATENT DOCUMENTS

| | | |
|---|---|---|
| 2015/0318733 A1 | 11/2015 | Stock et al. |
| 2015/0333559 A1 | 11/2015 | Lohr et al. |

FOREIGN PATENT DOCUMENTS

| | | |
|---|---|---|
| CN | 102189532 A | 9/2011 |
| DE | 10 2012 112 846.4 | 12/2012 |
| DE | 10 2013 201 706.5 | 2/2013 |
| DE | 10 2013 226 247.7 | 12/2013 |
| JP | H06-311660 A | 11/1994 |
| JP | 2002-134177 A | 5/2002 |
| JP | 2005/073350 | 3/2005 |
| JP | 2007-294274 A | 11/2007 |
| JP | 2008270007 | 11/2008 |
| JP | 2008-294385 A | 12/2008 |
| JP | 2010 206871 | 9/2010 |
| JP | 2011 034793 | 2/2011 |

* cited by examiner

RECHARGEABLE HAND TOOL BATTERY

BACKGROUND OF THE INVENTION

1. Field of the Invention

The present invention relates to a rechargeable handheld tool battery having at least one rechargeable cell and at least one inductive charging unit 2. Description of the Related Art A variety of rechargeable handheld tool batteries having at least one rechargeable cell and at least one inductive charging unit that has at least one inductive charging coil for charging the at least one rechargeable cell, have already been proposed.

BRIEF SUMMARY OF THE INVENTION

The invention proceeds from a rechargeable handheld tool battery having at least one rechargeable cell and at least one inductive charging unit that has at least one inductive charging coil for charging the at least one rechargeable cell.

It is proposed that a diameter of the inductive charging coil be greater than a principal extension length of the at least one rechargeable cell.

A "rechargeable handheld tool battery" is to be understood in particular as an apparatus having at least one rechargeable cell unit and units for charging and discharging the energy storage unit that is provided in order to supply a handheld power tool with electricity. The rechargeable handheld tool battery is preferably received in a receiving space of the handheld power tool or is detachably secured to the handheld power tool. Alternatively, it is also conceivable for the rechargeable handheld tool battery to be embodied separately from the handheld power tool and to be electrically connected via an electrical lead, for example a cable. A "handheld power tool" is to be understood in this connection in particular as an electrical device manually utilized by a user, in particular a power drill, a hammer drill, a saw, a planer, a driver, a milling cutter, a grinder, an angle grinder, and/or a multifunction tool, or a gardening tool such as a hedge trimmer, shrub trimmer, and/or grass trimmer. Alternatively, the rechargeable handheld tool battery can also be used in another manually utilized device, for example a measurement device. A "rechargeable cell unit" is to be understood in particular as a rechargeable energy storage unit having at least one rechargeable cell, which is provided in order to store energy in order to generate an electrical current and to charge by introduction of a charging current. The rechargeable cell unit can in particular have at least one rechargeable cell block, in which multiple rechargeable cells are connected in series. The rechargeable cell unit can also have multiple rechargeable cell blocks each having an identical number of rechargeable cells, which are provided in order to supply the handheld power tool successively with electricity so that the handheld power tool is supplied with electricity for a longer time than would be possible with a single rechargeable cell block. A "rechargeable cell" is to be understood in particular as a unit that is provided for electrochemical storage of electrical energy by way of a reversible reaction. The rechargeable cell can be constituted, for example, by a rechargeable lead cell, a rechargeable NiCd cell, a rechargeable NiMH cell, but preferably by a lithium-based rechargeable cell. The rechargeable cell can be constituted by rechargeable cells of different rated voltages, for example rated voltages of 1.2 V, 1.5 V, or 3.6 V. The rechargeable cells preferably have a cylindrical shape. The rechargeable handheld tool battery can have multiple rechargeable cells that are connected in a series circuit in order to achieve a higher total voltage for the rechargeable handheld tool battery. For example, the rechargeable handheld tool battery can have one rechargeable cell having a voltage of 3.6 V; two rechargeable cells connected in series, each having a voltage of 3.6 V, for a total voltage of 7.2 V for the rechargeable handheld tool battery; or three rechargeable cells connected in series, each having a voltage of 3.6 V, for a total voltage of 10.8 V for the rechargeable handheld tool battery. The rechargeable handheld tool battery can also have further rechargeable cells that are connected in parallel with the at least one first rechargeable cell and are provided in order to supply the handheld power tool with electricity after discharge of the at least one first rechargeable cell, thereby effectively increasing a capacity of the rechargeable handheld tool battery. With a series circuit of multiple rechargeable cells in order to generate a higher total voltage, multiple further rechargeable cells can correspondingly be connected in parallel with one another and in series with the series circuit in order to increase the capacity. With a series circuit of three rechargeable cells, the latter are preferably disposed in one plane perpendicular to a principal extension of the three rechargeable cells in a triangular shape. An "inductive charging unit" is to be understood in particular as a unit for charging the rechargeable cell unit, which receives a charging current by induction and which encompasses at least an inductive charging coil and a charging electronics system. The inductive charging unit furthermore preferably encompasses at least a coil core unit in order to increase an inductance of the at least one inductive charging coil. Advantageously, the inductive charging unit has a coil carrier that positions the inductive charging coil relative to the coil core. Advantageously, the inductive charging unit is furthermore provided, for control of a charging operation and in particular for foreign-object detection, in order to communicate with an inductive charging device of the inductive charging apparatus. An "inductive charging coil" is to be understood in this connection in particular as a coil having at least one winding made of an electrically conductive material, which, in at least one operating state, is provided to receive an electrical energy that is transferred by an induction coil of an inductive charging device and to deliver it via a charging electronics system to a rechargeable cell. The inductive charging coil is provided in particular to convert an alternating electromagnetic field into an alternating electrical current and/or vice versa. Preferably the alternating field has a frequency from 10 to 500 kHz, particularly preferably from 100 to 120 kHz. In particular, the direction perpendicular to the coil plane is embodied parallel to a winding axis of the inductive charging coil. A "charging electronics system" is to be understood in particular as an electronic unit that is provided in order to control a charging of rechargeable cells and that has the, in particular, electronic elements for a voltage transformation.

A "principal extension length" is to be understood in particular as a maximum extension of the rechargeable cell along an axis of symmetry. Preferably the rechargeable cell is disposed with the principal extension length parallel to a coil plane. A "coil plane" is to be understood in particular as a plane in which windings of the inductive charging coil extend. In particular, the coil plane proceeds perpendicularly to a winding axis of the inductive charging coil. Preferably the diameter of the inductive charging coil is greater than a length of a maximum extension of the rechargeable cells, for example a diagonal between two diametrically opposite corner regions of the rechargeable cell.

The configuration according to the present invention of the rechargeable handheld tool battery makes it possible in particular to achieve a rechargeable handheld tool battery having a short charging time.

It is further proposed that the rechargeable handheld tool battery have a battery housing having a coil receiving region for receiving the inductive charging coil, which forms at least in part a positive-fit element. A "battery housing" is to be understood in particular as an assembly that encompasses at least one housing component that delimits the rechargeable handheld tool battery at least in part with external walls with respect to an environment, and that is provided in particular to protect the inductive charging unit and the rechargeable cells, in a state installed and/or uninstalled on the handheld power tool, with respect to the environment and to prevent damage and/or soiling. In particular, the battery housing defines a shape and a size of the rechargeable handheld tool battery. Preferably the battery housing has securing apparatuses for securing the rechargeable handheld tool battery to the handheld tool. Advantageously, the battery housing has contact cutouts through which an electrical contact between the handheld tool and the at least one first rechargeable cell can be produced. In particular, the battery housing can be of completely or only partly closed configuration. With a partly closed configuration of the battery housing, a region of the rechargeable handheld tool battery unoccupied by the battery housing can be provided to be disposed, in a state in which the rechargeable handheld tool battery is installed on a handheld power tool, inside a housing of the handheld power tool. A "coil receiving region" is to be understood in particular as a region of the battery housing that at least partly encloses a space inside which the inductive charging coil of the inductive charging unit is disposed. Preferably the coil receiving region has an extent that is different in at least one direction from extents of battery housing regions that enclose rechargeable cells. The statement that "the coil receiving region forms at least in part a positive-fit element" is to be understood in particular to mean that the coil receiving region of the battery housing projects or is set back, on at least one lateral surface, preferably at least two lateral surfaces, of the battery housing, with respect to further regions of the battery housing, so that a corresponding positive-fit element of a further device, for example an inductive charging device or the handheld power tool, engages into a positive-fit receptacle constituted at least in part by the coil receiving region, or encloses a positive-fit projection constituted at least in part by the coil receiving region, in order to create a positive-fit connection. Particularly preferably the coil receiving region is embodied so that it projects on at least two lateral surfaces of the battery housing with respect to adjacent regions of the battery housing on the lateral surfaces, and forms a positive-fit projection. The positive-fit element is provided in particular to bring about, during a charging phase, a positive-fit attachment to an inductive charging device in order to achieve efficient energy transfer. A compact rechargeable handheld tool battery for simple attachment to an inductive charging device or to a handheld power tool can in particular be achieved while dispensing with separate external securing elements.

It is further proposed that the battery housing have a rechargeable cell receiving region for receiving the at least one rechargeable cell, which is set back relative to the coil receiving region. A "rechargeable cell receiving region" is to be understood in particular as a region of the battery housing that at least in part encloses a space inside which the at least one rechargeable cell and/or the at least one further rechargeable cell is disposed. The statement that "the rechargeable cell receiving region is set back relative to the coil receiving region" is to be understood in particular to mean that on at least one lateral surface, preferably on at least two lateral surfaces, of the battery housing, the rechargeable cell receiving region has a smaller extent in a direction of a perpendicular to the lateral surface than the coil receiving region. In particular, an advantageously small transverse extent of the rechargeable handheld tool battery in regions different from the coil receiving region, and thus a compact rechargeable handheld tool battery, can be achieved.

It is furthermore proposed that the inductive charging unit have a coil core unit having a plate region that shields the at least one first rechargeable cell at least in part with respect to the inductive charging coil. A "coil core unit" is to be understood in this connection in particular as a unit, made at least in part of a magnetic material, that is provided in order to increase an inductance of a coil. A "magnetic material" is to be understood in this connection preferably as a ferrimagnetic, in particular soft magnetic, material, for example ferrite. Alternatively, it is also conceivable to use ferromagnetic and/or antiferromagnetic materials. A "plate region" is to be understood in particular as a planar region of the coil core unit having a thickness that is at most half the size, in particular at most a quarter the size, and particularly preferably at most an eighth the size of a minimum extent of the coil core unit in a direction perpendicular to the thickness. A "thickness" of the coil core unit is to be understood in particular as an extent of the coil core unit in a direction perpendicular to the coil plane of the inductive charging coil. The statement that the plate region "shields the at least one rechargeable cell at least in part with respect to the inductive charging coil" is to be understood in particular to mean that field lines of a magnetic field that is generated by the inductive charging coil are diverted by the plate region of the coil core unit at least in part away from the at least one rechargeable cell. In particular, a field strength of the magnetic field at a position of the at least one rechargeable cell is thereby attenuated by at least ten percent, advantageously by at least twenty percent, preferably by at least forty percent, and particularly preferably by at least eighty percent with respect to a field strength present without the plate region. In particular, the plate region achieves the shielding of the at least one rechargeable cells by the fact that in the context of a projection of the at least one rechargeable cell onto the induction coil, at least sixty percent, advantageously at least eighty percent, and preferably at least ninety percent of an area of the projection extends through the plate region. In particular, the coil core unit can have different thicknesses in the plate region. In particular, the plate region of the coil core unit can have a sub-region that has a greater thickness than further sub-regions of the plate region and that extends preferably into a coil plane, and thus into a region enclosed in a plane perpendicular to the thickness of windings of the inductive charging coil. Preferably the sub-region that has a greater thickness than further sub-regions of the plate region is disposed on only one side of the plate region. In particular, the sub-region of the plate region that has a greater thickness than further sub-regions of the plate region can have a basic shape that differs from a basic shape of the plate region on a side facing away from the sub-region. In particular, the plate region can have a substantially rectangular basic shape and the sub-region can have a substantially circular basic shape added thereonto on one side. In particular, as a result of the at least partial shielding of the at least one rechargeable cell, a stress on the rechargeable cells resulting from the magnetic field of the inductive charging coil can be at least decreased, and damage to the rechargeable handheld tool battery can be prevented.

It is furthermore proposed that the plate region be of at least substantially rectangular configuration. "Of at least substantially rectangular configuration" is to be understood in particular to mean that the plate region has an area that is delimited by four sides of at least substantially straight configuration. "Sides of at least substantially straight configuration" is to be understood to mean, in particular, sides that have at least one side region, embodied as a straight line, whose length corresponds to at least fifty percent of a total length of the side. In particular, the sides of at least substantially straight configuration can delimit a rectangular shape, in particular a rectangular shape having rounded edges. In particular, the plate region can have an area having a basic shape of a rectangle having rounded sides, the circular sub-region of an area of the plate region preferably having a greater thickness than further sub-regions of the plate region, and extending into an inner region of the inductive charging coil which is enclosed by windings of the inductive charging coil. In particular, a coil core unit having a basic shape of simple configuration can be achieved.

It is further proposed that the plate region have at least one axial length that is shorter than a diameter of the inductive charging coil. An "axial length" is to be understood in particular as an extension length parallel to an at least substantially straight side of the plate region, a length of a major axis or minor axis of an elliptical plate region, or a diameter of a circular plate region. Preferably at least one further axial length of the plate region is greater than a diameter of the inductive charging coil. Preferably the plate region is embodied as a rectangular shape having rounded corners, which has an axial length that is shorter than the diameter of the inductive charging coil and that proceeds parallel to the principal extension direction of the at least one rechargeable cell, and an axial length, perpendicular thereto, that is greater than the diameter of the inductive charging coil. In particular, a stress on the coil core unit resulting from regions of very high field strengths of the inductive charging coil can be reduced.

In a refinement of the invention it is proposed that the coil core unit have multiple separate core pieces. The statement that "the coil core unit has multiple separate core pieces" is to be understood in this connection in particular to mean that the coil core unit has at least two and preferably at least four pieces, embodied separately from one another and disposed separately, that are made at least in part of a magnetic material. In particular, the multiple separate core pieces are disposed symmetrically with respect to one another. In particular, the coil core unit that has multiple separate core pieces has a greater mechanical stability than a one-piece embodiment of a coil core unit, with substantially identical magnetic properties. In particular, a coil core unit having good mechanical stability can be achieved.

It is further proposed that the rechargeable handheld tool battery have at least one heat distribution element that is provided in order to distribute a waste heat. A "heat distribution element" is to be understood in particular as an element that is provided in order to discharge at least in part from a delimited region, by thermal conduction, thermal radiation, or convection, a heat occurring locally in the delimited region, and to distribute it over a larger region. The heat distribution element has in particular a thermal conductivity that is at least twice, advantageously at least four times, and preferably at least ten times as great as a thermal conductivity of elements that surround the heat transport element. The statement that "the heat distribution element is provided in order to distribute a waste heat" is to be understood in particular to mean that the thermal distribution element has an area that is at least twice, advantageously at least four times, and preferably at least ten times the size of an area of the delimited region and is provided in order to discharge the heat directed away from the delimited region. A "waste heat" is to be understood in particular as a heat occurring as a byproduct upon charging and/or discharging of the at least one rechargeable cell. Preferably the thermal distribution element is thermally conductively connected to the charging electronics system and to the at least one rechargeable cell. In particular, damage to the rechargeable handheld tool battery as a result of locally elevated temperatures, as well as negative effects on a charging operation or a discharging operation of the at least one rechargeable cell resulting from locally different temperatures, can be avoided.

It is furthermore proposed that the heat distribution element have at least one thermal conduction coating. A "thermal conduction coating" is to be understood in particular as a coating made of a material that has a thermal conductivity that is at least twice, advantageously four times, and preferably at least ten times as great as a thermal conductivity of a material on which the thermal conduction coating is applied. A "coating" is to be understood in particular as a layer, applied onto at least one area of a carrier element, that has a thickness that is at most a fifth, advantageously at most a tenth, and preferably at most a twentieth of a thickness of the carrier element. Preferably the thermal conduction element has a thickness that is at most in the millimeter range. Preferably the thermal conduction coating is manufactured at least in part from aluminum, and is applied onto a carrier element embodied as a bracket.

Particularly preferably the bracket is provided in order to space the charging electronics system away from the at least one rechargeable cell. A thermal conduction element that is simple to manufacture and saves material can in particular be achieved.

It is furthermore proposed that at least the inductive charging unit be embodied as a preassembled module. A "preassembled module" is to be understood in particular to mean that the inductive charging unit, the at least one inductive charging coil, a coil carrier onto which the inductive charging coil is mounted and that encompasses the charging electronics system, are assembled together in one step upon manufacture of the rechargeable handheld tool battery and in further steps are installed as a complete module along with further components of the rechargeable handheld tool battery; and that the inductive charging unit as a whole is removable from the handheld tool and separately testable as to a functional capability and/or is installable in another rechargeable handheld tool battery. Preferably the preassembled module encompasses, in addition to the inductive charging unit, at least one battery housing component that receives the coil carrier, and a heat distribution element, embodied as a bracket, which holds together the individual sub-elements of the preassembled module after assembly. In particular, simplified installation of the rechargeable handheld tool battery can be achieved, and an inductive charging unit that is removable for use in multiple different rechargeable handheld tool batteries is made available.

It is furthermore proposed that the rechargeable handheld tool battery have an installation direction, for installation of the rechargeable handheld tool battery on a handheld power tool, which extends at least substantially parallel to a coil plane of the inductive charging unit. In particular, simple installation of the rechargeable handheld tool battery on the handheld power tool can be achieved.

A system having a handheld power tool and a rechargeable handheld tool battery according to the present invention is furthermore proposed. Preferably the handheld power tool and the rechargeable handheld tool battery are detachable from one another without tools. "Detachable from one another without tools" is to be understood in particular to mean that the rechargeable handheld tool battery, after being secured on a handheld power tool, can be removed by a user from the handheld power tool without damage. In particular, the rechargeable handheld tool battery and/or the handheld power tool can have securing means for securing the rechargeable handheld tool battery on the handheld power tool, which can be released by the user in order to detach the rechargeable handheld tool battery from the handheld power tool. Preferably the rechargeable handheld tool battery is embodied to be insertable or slidable into the handheld power tool, and can be detached from the handheld power tool by pulling. In particular, a system with easy exchangeability of the rechargeable handheld tool battery can be achieved. In particular, the system can have an installation direction, for installing the rechargeable handheld tool battery on the handheld power tool, which extends substantially parallel or perpendicular to a coil plane of the inductive charging unit.

In a refinement of the invention, it is proposed that with the handheld power tool and the rechargeable handheld tool battery in an assembled state, the at least one first rechargeable cell be at least substantially surrounded by a handle housing. "At least substantially surrounded by a handle housing" is to be understood in particular to mean that the at least one first rechargeable cell is enclosed by the housing, over at least fifty percent of a length along the principal extension direction on a plane perpendicular to the principal extension direction, over an angular region of at least one hundred eighty degrees, preferably at least two hundred seventy degrees, and particularly preferably three hundred sixty degrees. Preferably the at least one inductive coil is disposed, in the installed state, at least substantially outside the handle housing. "Disposed at least substantially outside the handle housing" is to be understood in particular to mean that at least fifty percent, advantageously at least seventy percent of a volume is disposed outside the handle housing. In particular, a compact system made up of a handheld power tool and rechargeable handheld tool battery, having advantageous handling properties, can be achieved.

A system having an inductive charging apparatus and a rechargeable handheld tool battery according to the present invention is furthermore proposed.

In a refinement of the invention, it is proposed that the inductive charging apparatus have positive-fit elements for securing the rechargeable handheld tool battery during a charging phase. "Positive-fit elements" are to be understood in particular as elements that are provided in order to interact with corresponding positive-fit elements of the rechargeable handheld tool battery for positively fitting securing of the rechargeable handheld tool battery during the charging phase. In particular, the inductive charging apparatus and the rechargeable handheld tool battery are detachable from one another without tools. A "charging phase" is to be understood in particular as a time period during which the at least one rechargeable cell is being charged with an electrical energy transmitted from the inductive charging apparatus and received by the inductive charging unit of the rechargeable handheld tool battery. For example, the inductive charging apparatus can have positive-fit elements, embodied as recesses, for reception of a coil receiving region of the battery housing which projects with respect to a battery receiving region. An interruption of the charging phase or a decrease in transfer efficiency due to relative displacements of the inductive charging apparatus and the rechargeable handheld tool battery can, in particular, be avoided.

It is furthermore proposed that the inductive charging apparatus and the rechargeable handheld tool battery have a positioning protrusion and a positioning recess having basic shapes differing from one another. A "positioning protrusion" is to be understood in particular as a surface region that projects with respect to adjacent surface regions and is provided for engagement into the positioning recess. A "positioning recess" is to be understood in particular as a surface region that is set back with respect to adjacent surface regions and is provided for reception of the positioning protrusion. In particular, the positioning protrusion and the positioning recess are embodied with basic shapes that differ from but correspond to one another; for example, the positioning protrusion can have a circular shape having a diameter that corresponds to a side length of a square positioning recess. The positioning protrusion preferably has, at least in a region, preferably in an end region, of one side, a smaller transverse extent than a transverse extent of the positioning recess, so that insertion is facilitated. In particular, simple introduction of the positioning protrusion into the positioning recess can be achieved.

An inductive charging unit of a rechargeable handheld tool battery, which is embodied as a preassembled module, is furthermore proposed.

The rechargeable handheld tool battery according to the present invention is not intended to be limited here to the utilization and embodiment described above. In particular, the rechargeable handheld tool battery according to the present invention can have, in order to achieve a functionality described herein, a number of individual elements, components, and units that differs from the number recited herein.

DETAILED DESCRIPTION OF THE INVENTION

Figure 1:
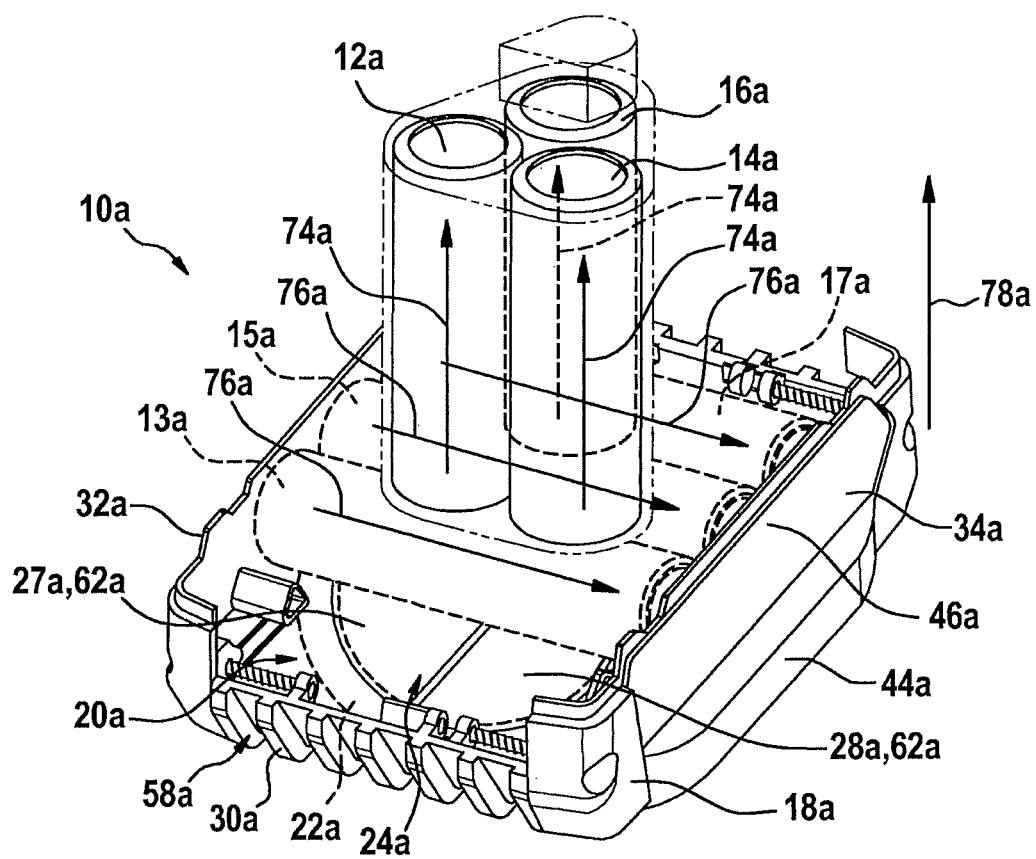
FIG. 1 shows, in a partly open view with the housing cover removed, a rechargeable handheld tool battery according to the present invention that encompasses three first rechargeable cells which have a principal extension direction that proceeds perpendicularly to a coil plane of an inductive charging unit, and three further rechargeable cells.

FIG. 1 shows a rechargeable handheld tool battery 10a according to the present invention having three first rechargeable cells 12a, 14a, and 16a and an inductive charging unit 20a that has an inductive charging coil 22a for charging first rechargeable cells 12a, 14a, 16a, in which first rechargeable cells 12a, 14a, 16a have a principal extension direction 74a that is oriented perpendicularly to a coil plane of inductive charging unit 20a. The coil plane of inductive charging unit 20a corresponds to a coil plane of inductive charging coil 22a in which windings of inductive charging coil 22a proceed and which is perpendicular to a winding axis of inductive charging coil 22a. Rechargeable handheld tool battery 10a furthermore encompasses three further rechargeable cells 13a, 15a, 17a having a principal extension direction 76a that is oriented parallel to the coil plane of inductive charging unit 20a. Further rechargeable cells 13a, 15a, 17a are disposed between first rechargeable cells 12a, 14a, 16a and inductive charging coil 22a. First rechargeable cells 12a, 14a, 16a and further rechargeable cells 13a, 15a, 17a are constituted by rechargeable lithium ion batteries having a rated voltage of 3.6 V. In principle, rechargeable batteries having other electrolytes, for example nickel-metal hydride batteries, nickel-cadmium batteries, or nickel-zinc batteries, and/or having different rated voltages, can also be used as rechargeable cells 12a, 13a, 14a, 15a, 16a, 17a. First rechargeable cells 12a, 14a, 16a are connected together in a series circuit to yield a first cell block having a total voltage of 10.8 V, and further rechargeable cells 13a, 15a, 17a are connected together in a series circuit to yield a second cell block having a total voltage of 10.8 V. The first cell block is provided to be the first to supply a handheld power tool 36a with electricity, and the second cell block is provided in order to supply handheld power tool 36a with electricity after a discharge of the first cell block, so that rechargeable handheld tool battery 10a has in total twice as much capacity as in the case of utilization of a single cell block made up respectively of three first rechargeable cells 12a, 14a, 16a or further rechargeable cells 13a, 15a, 17a. In principle, cells both of first rechargeable cells 12a, 14a, 16a and of further rechargeable cells 13a, 15a, 17a can be connected together in series in one cell block. All the rechargeable cells 12a, 13a, 14a, 15a, 16a, 17a can also be connected together into one common cell block. In a simple embodiment of rechargeable handheld tool battery 10a, rechargeable handheld tool battery 10a encompasses only a single cell block having the three first rechargeable cells 12a, 14a, 16a, which in an installed state are received at least in part in a handle 38a of a handheld power tool 36a. This embodiment is indicated in FIG. 1 by the fact that the second cell block made up of further rechargeable cells 13a, 15a, 17a, which is not contained in this embodiment, is depicted with dashed lines.

Figure 6:
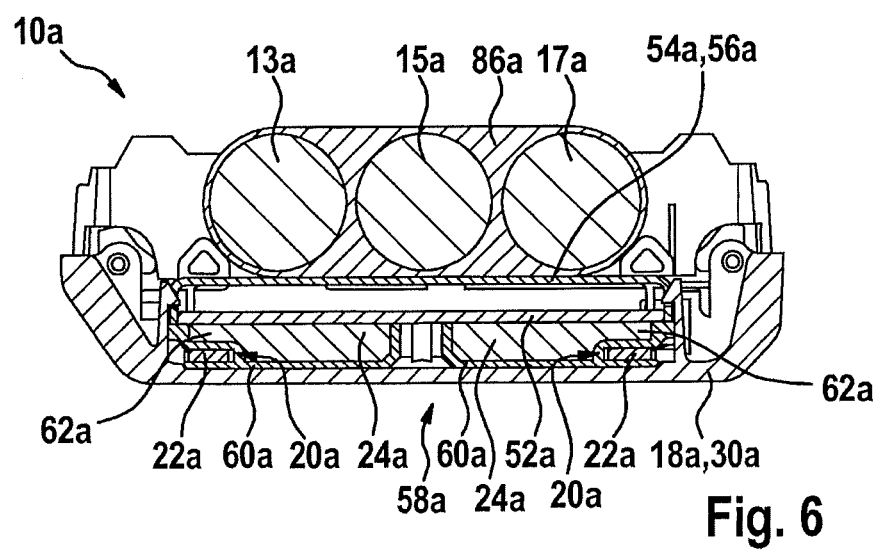
FIG. 6 is a lateral section through FIG. 4.

Inductive charging unit 20a has a coil core unit 24a having a plate region 62a that shields first rechargeable cells 12a, 14a, 16a and further rechargeable cells 13a, 15a, 17a with respect to inductive charging coil 22a. Rechargeable cells 12a, 13a, 14a, 15a, 16a, 17a are disposed in receiving spaces of rechargeable cell carriers 86a made of a plastic. For better depiction of the dispositions of rechargeable cells 12a, 13a, 14a, 15a, 16a, 17a inside rechargeable handheld tool battery 10a, rechargeable cell carriers 86a are not depicted in FIG. 1. Rechargeable cell carriers 86a are embodied to be open in a direction parallel to principal extension directions 74a, 76a of rechargeable cells 12a, 13a, 14a, 15a, 16a, 17a, so that rechargeable cells 12a, 13a, 14a, 15a, 16a, 17a can be introduced into and guided out of rechargeable cell carriers 86a in that direction. Rechargeable cell carriers 86a secure rechargeable cells 12a, 13a, 14a, 15a, 16a, 17a relative to one another and surround them in part in a direction perpendicular to principal extension directions 74a, 76a. Coil core unit 24a is disposed between inductive charging coil 22a and rechargeable cells 12a, 13a, 14a, 15a, 16a, 17a and separates them from one another (FIG. 6). Inductive charging coil 22a is depicted in FIG. 1 with dashed lines in order to depict its placement relative to rechargeable cells 12a, 13a, 14a, 15a, 16a, 17a. Rechargeable handheld tool battery 10a furthermore encompasses a battery housing 18a for reception of inductive charging unit 20a and of rechargeable cells 12a, 13a, 14a, 15a, 16a, 17a, having a coil receiving region 44a for receiving inductive charging coil 22a which at least in part constitutes a positive-fit element, and having a rechargeable cell receiving region 46a for receiving further rechargeable cells 13a, 15a, 17a, which is set back relative to coil receiving region 44a. Viewed in a plane perpendicular to principal extension direction 74a of first rechargeable cells 12a, 14a, 16a, coil receiving region 44a projects beyond rechargeable cell receiving region 46a along at least one axis. Battery housing 18a has a central housing component 30a and two lateral housing components 32a, 34a which form coil receiving region 44a and rechargeable cell receiving region 46a, and is manufactured from a plastic. Housing components 32a, 34a that form coil receiving region 44a define a left side and a right side, and end regions of central housing component 30a define a front side and a back side of rechargeable handheld tool battery 10a, a display having an LED element being disposed, for signaling a charge state, on the front side of rechargeable handheld tool battery 10a. Rechargeable handheld tool battery 10a furthermore has connecting elements (not depicted in further detail) for creating an electrically conductive connection between rechargeable cells 12a, 13a, 14a, 15a, 16a, 17a and a current collector.

Figure 2:
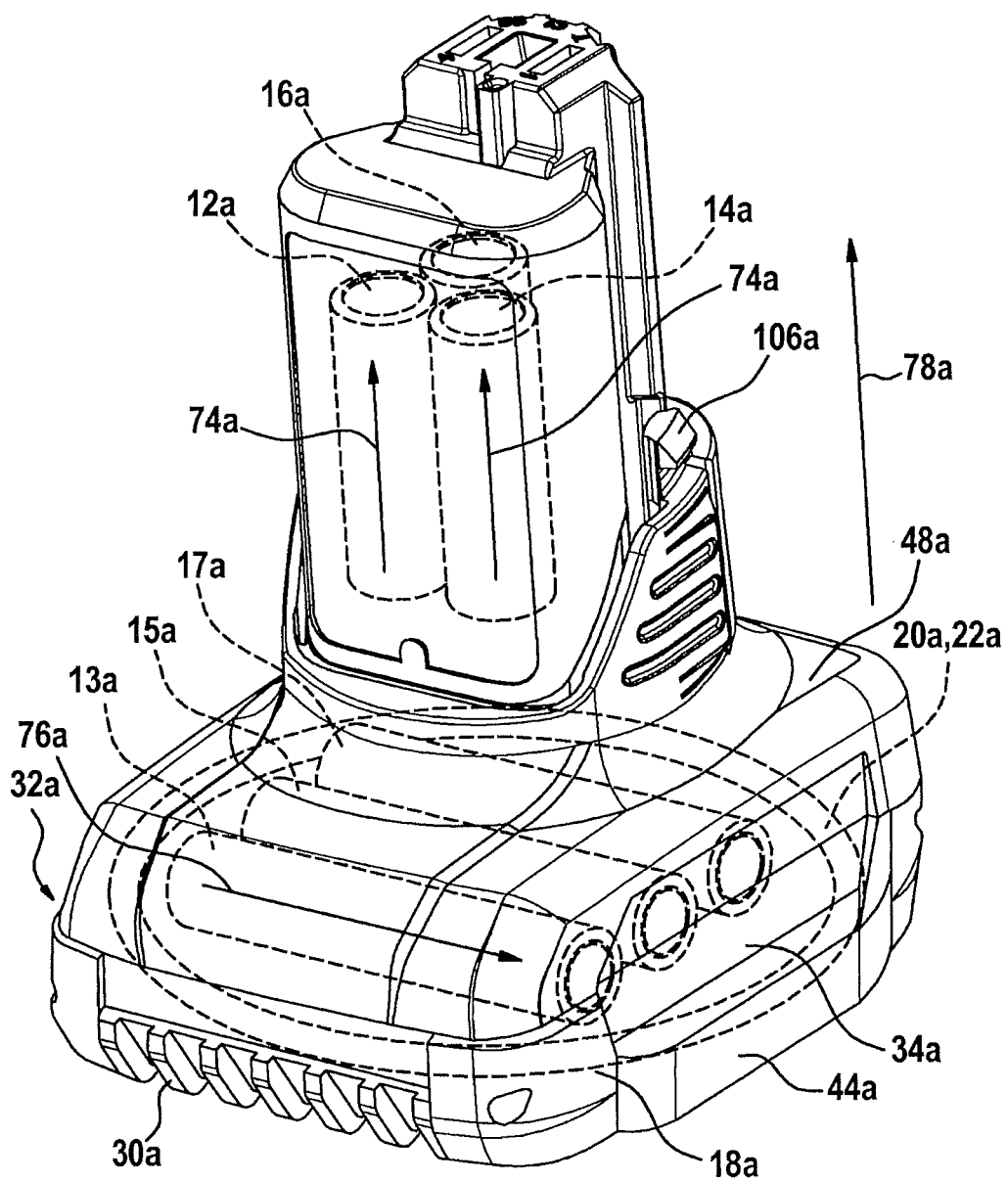
FIG. 2 is an external view of the rechargeable handheld tool battery depicted in FIG. 1.

FIG. 2 shows rechargeable handheld tool battery 10a depicted in FIG. 1 with a completely closed battery housing 18a having a housing component 48a that is placed onto housing components 30a, 32a, 34a and forms an upper closure. Housing component 48a encloses first rechargeable cells 12a, 14a, 16a and has on oppositely located sides locking elements 106a that are embodied as latching elements. At the upper end (in FIG. 2) of battery housing 18a, rechargeable handheld tool battery 10a encompasses a contact region (not further characterized in FIG. 2) having electrical contact elements for electrical contacting to complementary electrical contact elements of a handheld power tool.

Figure 3:
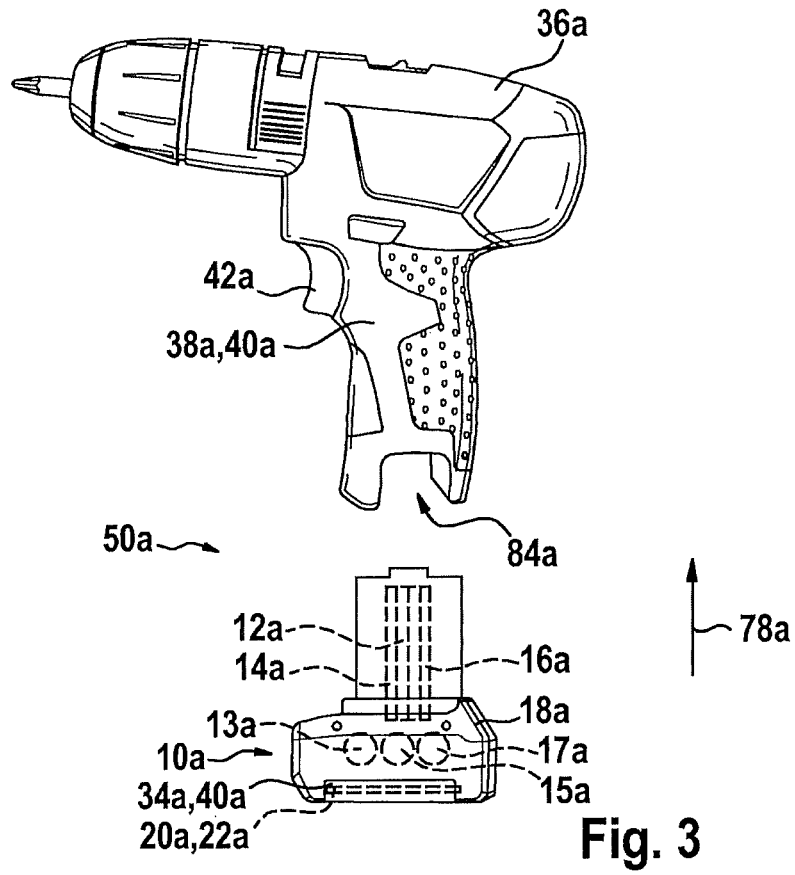
FIG. 3 shows a system made up of a handheld power tool and the rechargeable handheld tool battery according to the present invention, in an unassembled state.
Figure 4:
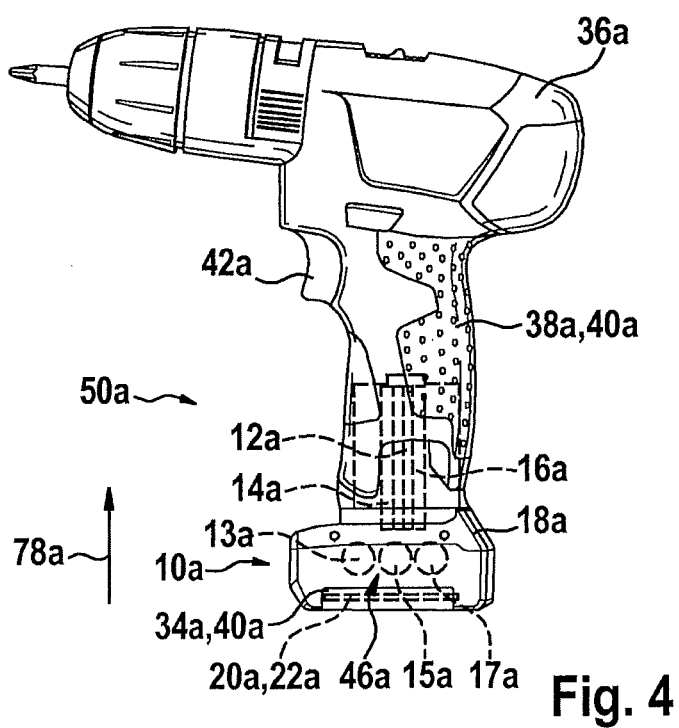
FIG. 4 shows the system made up of a handheld power tool and a rechargeable handheld tool battery, in an assembled state.

FIG. 3 shows a system 50a made up of a handheld power tool 36a and rechargeable handheld tool battery 10a according to the present invention, in an unassembled state. Handheld power tool 36a is constituted by a battery-powered drill driver that has a handle 38a having a handle housing 40a that encloses a rechargeable handheld tool battery receptacle 84a. Disposed on handle 38a is an actuation switch 42a that, upon actuation, closes an electrical circuit between rechargeable handheld tool battery 10a and handheld power tool 36a so that handheld power tool 36a is supplied with electricity for operation. A housing component 48a, which in the exemplifying embodiment depicted is embodied as a battery housing cover, forms together with housing components 30a, 32a, 34a the battery housing 18a of rechargeable handheld tool battery 10a. Rechargeable handheld tool battery 10a is secured on handheld power tool 36a by way of locking elements 106a on housing component 48a. Rechargeable handheld tool battery 10a is secured onto handheld power tool 36a without tools, by insertion into rechargeable handheld tool battery receptacle 84a having locking elements 106a (FIG. 4). An installation direction 78a for installing rechargeable handheld tool battery 10a on handheld power tool 36a proceeds perpendicularly to the coil plane of inductive charging unit 20a and thus parallel to principal extension direction 74a of first rechargeable cells 12a, 14a, 16a. Rechargeable handheld tool battery 10a is thus installed onto handheld power tool 36a with an insertion motion. With handheld power tool 36a and rechargeable handheld tool battery 10a in an assembled state, first rechargeable cells 12a, 14a, 16a are surrounded over an angle range of three hundred and sixty degrees, over sixty percent of a length along principal extension direction 74a on a plane perpendicular to principal extension direction 74, by handle housing 40a. In the assembled state, inductive charging coil 22a is disposed outside handle housing 40a, a total volume of inductive charging coil 22a being located outside handle housing 40a. In the assembled state, further rechargeable cells 13a, 15a, 17a are likewise disposed outside handle housing 40a. Handheld power tool 36a and rechargeable handheld tool battery 10a are detachable from one another without tools, and rechargeable handheld tool battery 10a can be pulled out of rechargeable handheld tool battery receptacle 84a after actuation of a release element (not depicted).

Figure 5:
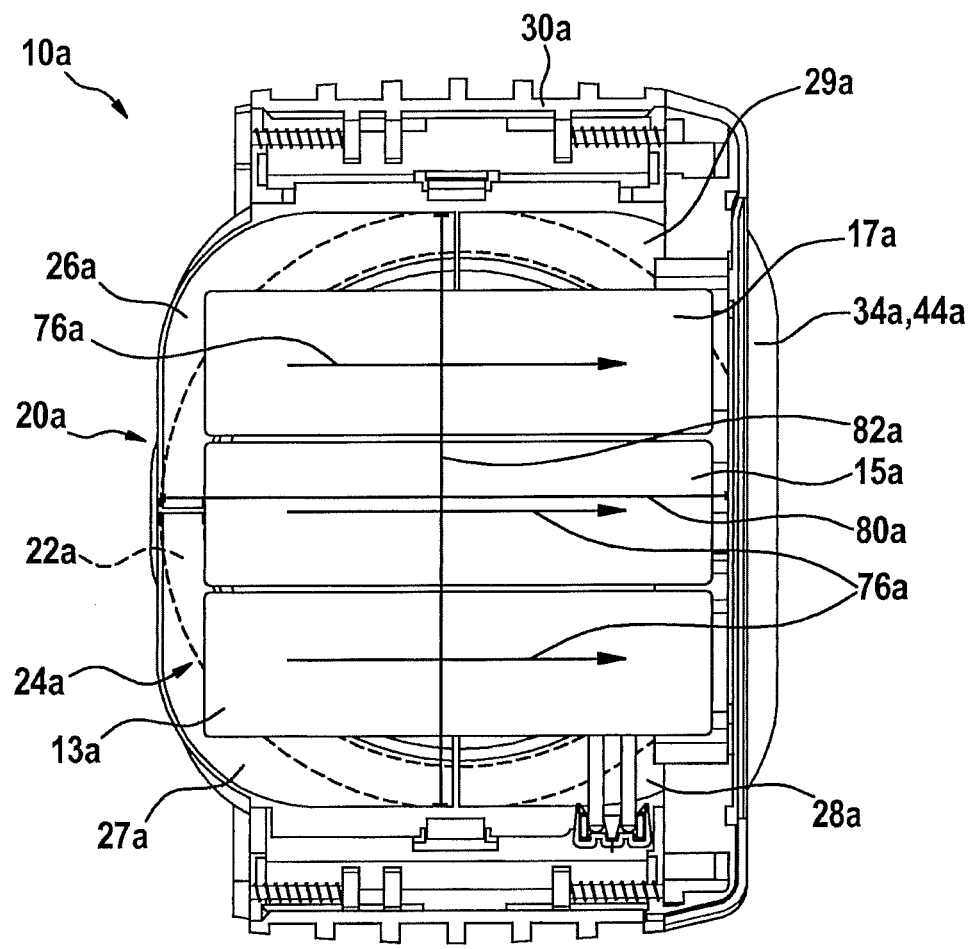
FIG. 5 is a partial depiction of the rechargeable handheld tool battery according to the present invention, looking from above at the further rechargeable cells and at an inductive charging coil of the inductive charging unit.
Figure 8:
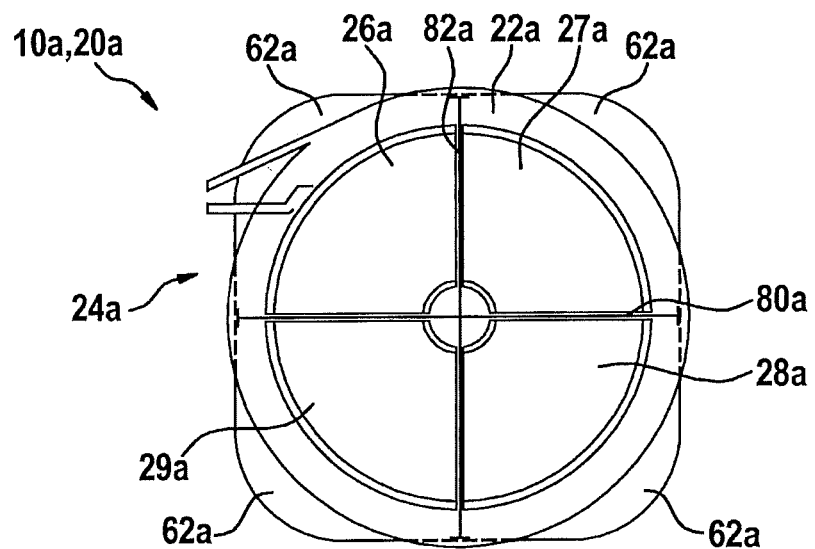
FIG. 8 is a view of the inductive charging coil and a coil core unit, showing shielding as a result of the coil core unit.
Figure 9:
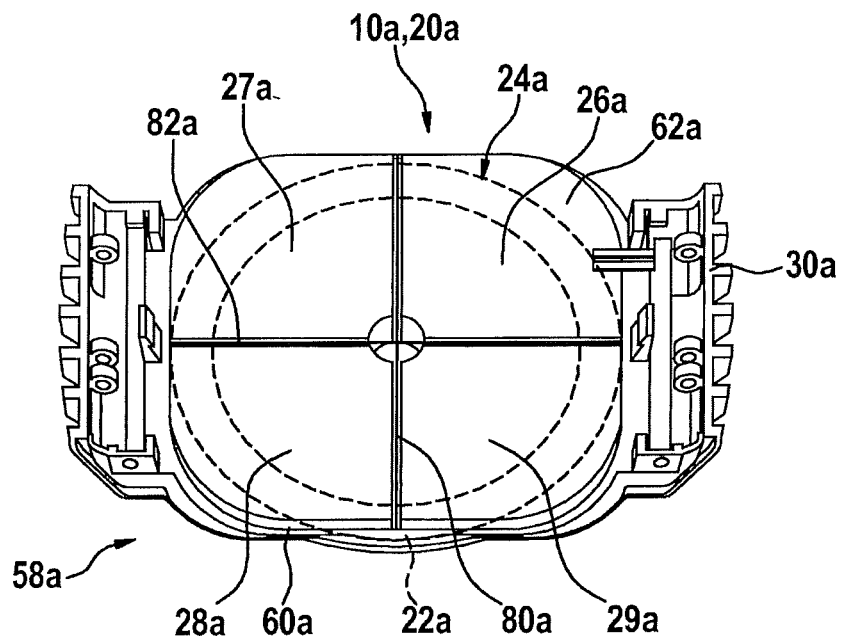
FIG. 9 is a view from above of the coil core unit and the inductive charging coil.

A diameter of inductive charging coil 22a is greater than a principal extension length of further rechargeable cells 13a, 15a, 17a, which is constituted by a length along principal extension direction 76a (FIG. 5). The diameter of inductive charging coil 22a is furthermore greater than a diameter of first rechargeable cells 12a, 14a, 16a in a direction perpendicular to principal extension direction 74a. In addition, the diameter of the inductive charging coil is greater than a length of a maximum extension of first rechargeable cells 12a, 14a, 16a, for example a diagonal between two diametrically opposite corner regions of first rechargeable cells 12a, 14a, 16a. The diameter of inductive charging coil 22a is moreover greater than a principal extension length of first rechargeable cells 12a, 14a, 16a. Inductive charging coil 22a thus projects beyond all the rechargeable cells 12a, 13a, 14a, 15a, 16a, 17a, rapid charging of rechargeable cells 12a, 13a, 14a, 15a, 16a, 17a thereby being achieved. Inductive charging coil 22a is disposed in coil receiving region 44a of battery housing 18a, which projects beyond rechargeable cell receiving region 46a. Inductive charging coil 22a is separated by plate region 62a of coil core unit 24a from rechargeable cells 12a, 13a, 14a, 15a, 16a, 17a, and is depicted in FIG. 5 with dashed lines in the regions covered by plate region 62a, in order to illustrate the position. Plate region 62a is of rectangular configuration and has the shape of a square having rounded corners. Axial lengths 80a, 82a of plate region 62a are shorter than a diameter of inductive charging coil 22a (FIG. 8). Coil core unit 24a has four separate core pieces 26a, 27a, 28a, 29a that each correspond to quarters of the square having rounded corners (FIG. 9). The individual core pieces 26a, 27a, 28a, 29a rest in a coil carrier 60a in which inductive charging coil 22a is also clamped, and are separated from one another by plastic elements of coil carrier 60a. In a region facing away from the rounded corners, the individual core pieces 26a, 27a, 28a, 29a have on one side a region having an increased thickness, which in the assembled state is disposed inside the coil plane of inductive charging coil 22a. In the assembled state, the regions having an increased thickness are enclosed by inductive charging coil 22a and are contiguous to it (FIG. 8).

Figure 7:
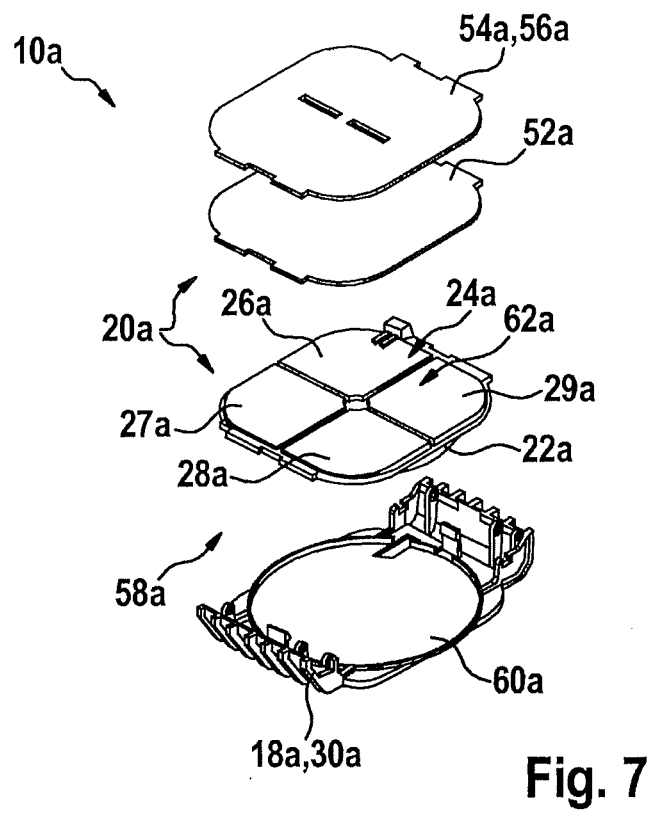
FIG. 7 depicts components of the inductive charging unit as a preassembled module.

Inductive charging unit 20a encompasses inductive charging coil 22a, coil core unit 24a, a charging electronics system 52a, coil carrier 60a, central housing component 30a that secures coil carrier 60a, and a heat distribution element 54a, and is embodied as a preassembled module 58a that can be removed separately, so that inductive charging coil 22a and charging electronics system 52a can be checked for functionality (FIG. 7). Heat distribution element 54a is provided in order to distribute a waste heat of charging electronics system 52a upon charging of rechargeable cells 12a, 13a, 14a, 15a, 16a, 17a and a waste heat of rechargeable cells 12a, 13a, 14a, 15a, 16a, 17a upon discharging, so that local overheating is avoided. Heat distribution element 54a is embodied for this purpose as a bracket that extends along a principal axis of central housing component 30a through rechargeable handheld tool battery 10a (FIG. 6). Lateral regions of heat distribution element 54a are in contact with charging electronics system 52a, and a central region of heat distribution element 54a is in contact on one side with rechargeable cell carrier 86a in which rechargeable cells 12a, 13a, 14a, 15a, 16a, 17a are disposed, so that heat can flow between rechargeable cells 12a, 13a, 14a, 15a, 16a, 17a and charging electronics system 52a via heat distribution element 54a. Heat distribution element 54a has a thermal conduction coating 56a made of aluminum. In an alternative embodiment, heat distribution element 54a can also be embodied as a component manufactured entirely from aluminum. Charging electronics system 52a is coated in part with a copper layer in order to shield rechargeable cells 12a, 13a, 14a, 15a, 16a, 17a with respect to inductive charging coil 22a.

Figure 10:
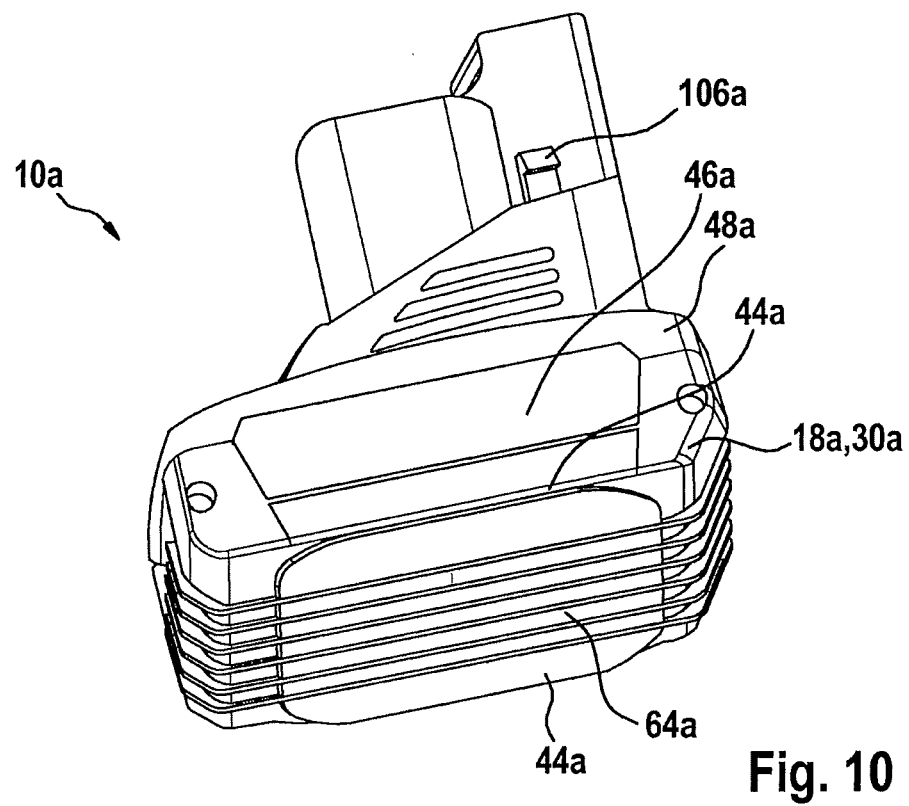
FIG. 10 is a view of a positioning protrusion of the rechargeable handheld tool battery according to the present invention.

FIG. 10 is a view of rechargeable handheld tool battery 10a obliquely from below, looking at an underside of battery housing 18a which faces away from first rechargeable cells 12a, 14a, 16a and from housing component 48a. Disposed on the underside is a positioning projection 64a having a square basic shape which has rounded corners, which upon placement of rechargeable handheld tool battery 10a with the underside on a substrate makes contact with the substrate, whereas other sub-regions of the underside have no contact with the substrate. Positioning projection 64a is furthermore provided for engagement into a positioning recess 68a of an inductive charging apparatus 66a.

Figure 11:
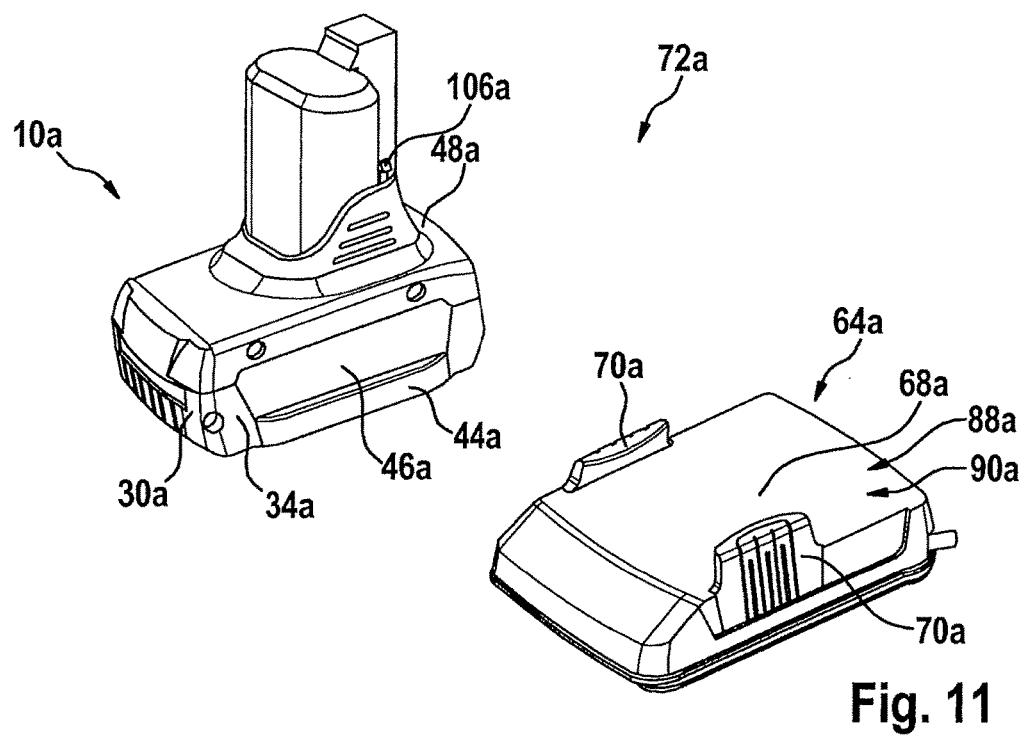
FIG. 11 shows a system made up of the rechargeable handheld tool battery according to the present invention and an inductive charging apparatus having a positioning recess.
Figures 12, 13:
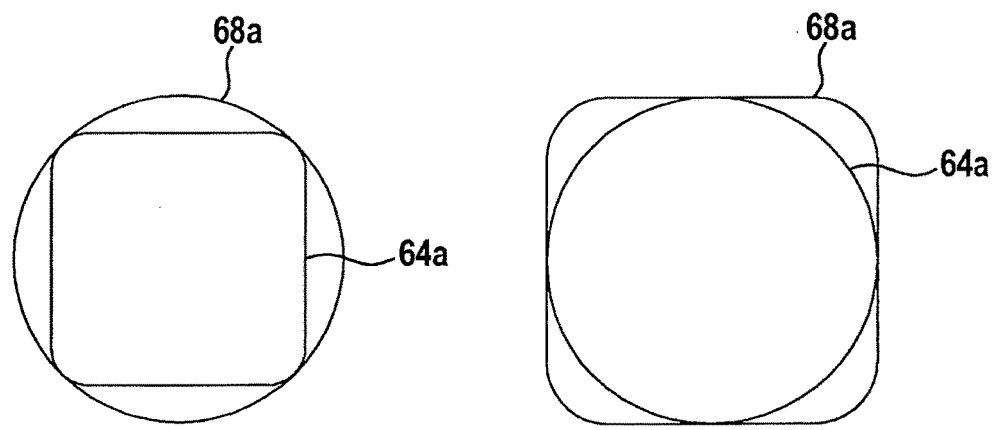
FIG. 12 schematically depicts different basic shapes of a positioning protrusion and positioning recess.
FIG. 13 shows an alternative embodiment of different basic shapes of a positioning protrusion and positioning recess.

FIG. 11 shows a system 72a having inductive charging apparatus 66a which encompasses an inductive charging device 88a, and having rechargeable handheld tool battery 10a. Inductive charging device 88a has on an upper side a placement surface 90a having positioning recess 68a, onto which rechargeable handheld tool battery 10a is placed in order to charge rechargeable cells 12a, 13a, 14a, 15a, 16a, 17a. Positioning recess 68a has a circular basic shape and a depth of 3 mm. Other dimensions that seem useful to one skilled in the art are also conceivable, however, for example a depth of 2 mm, 5 mm, or only 1 mm. Positioning projection 64a has a setback height corresponding to the depth of positioning receptacle 68a. Positioning projection 64a and positioning recess 68a thus have basic shapes that differ from one another. The dimensions of positioning projection 64a and of positioning recess 68a are adapted to one another, and in particular the dimensions of positioning recess 68a are adapted to surround positioning projection 64a securely and with little clearance. A small tolerance is provided between the dimensions of positioning projection 64a and of positioning recess 68a. Latching of positioning projection 64a into positioning recess 68a is haptically perceptible by an operator, and signals to the operator a positioning of rechargeable handheld tool battery 10a on inductive charging device 88a of inductive charging apparatus 66a which is optimum for a charging operation. In the variant depicted, positioning projection 64a having the basic shape of a square with rounded corners is provided for reception in the circular positioning recess 68a (FIG. 12); alternatively, positioning projection 64a can also have a circular basic shape and can be provided for reception inside a positioning recess 68a having a square basic shape (FIG. 13). Alternatively, it is also possible for inductive charging device 88a of inductive charging apparatus 66a to have a positioning projection 64a, and for rechargeable handheld tool battery 10a to have a positioning recess 68a.

Upon charging of rechargeable cells 12a, 13a, 14a, 15a, 16a, 17a, electrical energy is transferred by induction, via an induction coil (not depicted) of inductive charging device 88a of inductive charging apparatus 66a, to inductive charging coil 22a of rechargeable handheld tool battery 10a, and induces an electrical current therein. The electrical current is transformed, and charging controlled, by way of charging electronics system 52a. Thanks to the reception of positioning projection 64a in positioning recess 68a upon placement of rechargeable handheld tool battery 10a onto inductive charging device 88a of inductive charging apparatus 66a during a charging phase of rechargeable handheld tool battery 10a, inductive charging coil 22a of rechargeable handheld tool battery 10a and the induction coil of inductive charging device 88a of inductive charging apparatus 66a are disposed relative to one another in a position in which a high transfer efficiency is achieved. A relative displacement of rechargeable handheld tool battery 10a and inductive charging device 88a of inductive charging apparatus 66a with respect to one another during the charging phase, for example due to inadvertent impact, is prevented in part by the reception of positioning projection 64a in positioning recess 68a. In addition, inductive charging device 88a of inductive charging apparatus 66a has positive-fit elements 70a for securing rechargeable handheld tool battery 10a during the charging phase. Positive-fit elements 70a are embodied as retaining tabs and have a positive-fit recess that is provided for reception of coil reception region 44a of rechargeable handheld tool battery 10a. Positive-fit elements 70a are attached in resiliently mounted fashion on oppositely located sides of inductive charging device 88a of inductive charging apparatus 66a, and can be deflected in a direction parallel to a normal direction of placement surface 90a. In order to place rechargeable handheld tool battery 10a onto inductive charging device 88a of inductive charging apparatus 66a and to secure it thereon, rechargeable handheld tool battery 10a is set onto inductive charging apparatus 66a with a tilt, so that coil receiving region 44a engages beneath positive-fit elements 70a on one side. Rechargeable handheld tool battery 10a is then oriented parallel to placement surface 90a so that positive-fit elements 70a are deflected in an upward direction, directed away from placement surface 90a, in the normal direction. Rechargeable handheld tool battery 10a is then slid between positive-fit elements 70a on placement surface 90a until positioning projection 64a engages into positioning recess 68a. Positive-fit elements 70a then fit around coil receiving region 44a of battery housing 18a from above. Positive-fit elements 70a now retain rechargeable handheld tool battery 10a in its position, preventing lifting. In order to remove rechargeable handheld tool battery 10a from inductive charging device 88a of inductive charging apparatus 66a, rechargeable handheld tool battery 10a is pulled out of inductive charging apparatus 66a with a motion in which rechargeable handheld tool battery 10a is pulled in a direction along a principal extension of the positive-fit recess of positive-fit elements 70a, and simultaneously lifted in the normal direction of placement surface 90a. Positive-fit elements 70a are mounted on a main body of inductive charging device 88a of inductive charging apparatus 66a with a clip attachment, and are embodied to be removable from the main body without tools.

In principle, positive-fit elements 70a can also be embodied to be integrally and inseparably connected to the main body. In a further possible alternative embodiment, positive-fit elements 70a can be mounted in laterally resiliently deflectable fashion, and can be deflected laterally in order to secure rechargeable handheld tool battery 10a. In the alternative embodiment of inductive charging device 88a of inductive charging apparatus 66a, in order to remove rechargeable handheld tool battery 10a the positive-fit elements 70a are again deflected laterally so that rechargeable handheld tool battery 10a can be pulled out.

FIGS. 14 to 19 show four further exemplifying embodiments of the invention. The descriptions below, and the drawings, are limited substantially to the differences among the exemplifying embodiments, the reader also being referred in principle with regard to identically designated components, in particular with reference to components having identical reference characters, to the drawings and/or the description of the other exemplifying embodiments, in particular to FIGS. 1 to 13. In order to distinguish the exemplifying embodiments, the letter "a" is added to the reference characters of the exemplifying embodiment in FIGS. 1 to 13. In the exemplifying embodiments of FIGS. 14 to 19 the letter "a" is replaced by the letters "b" to "e".

Figure 14:
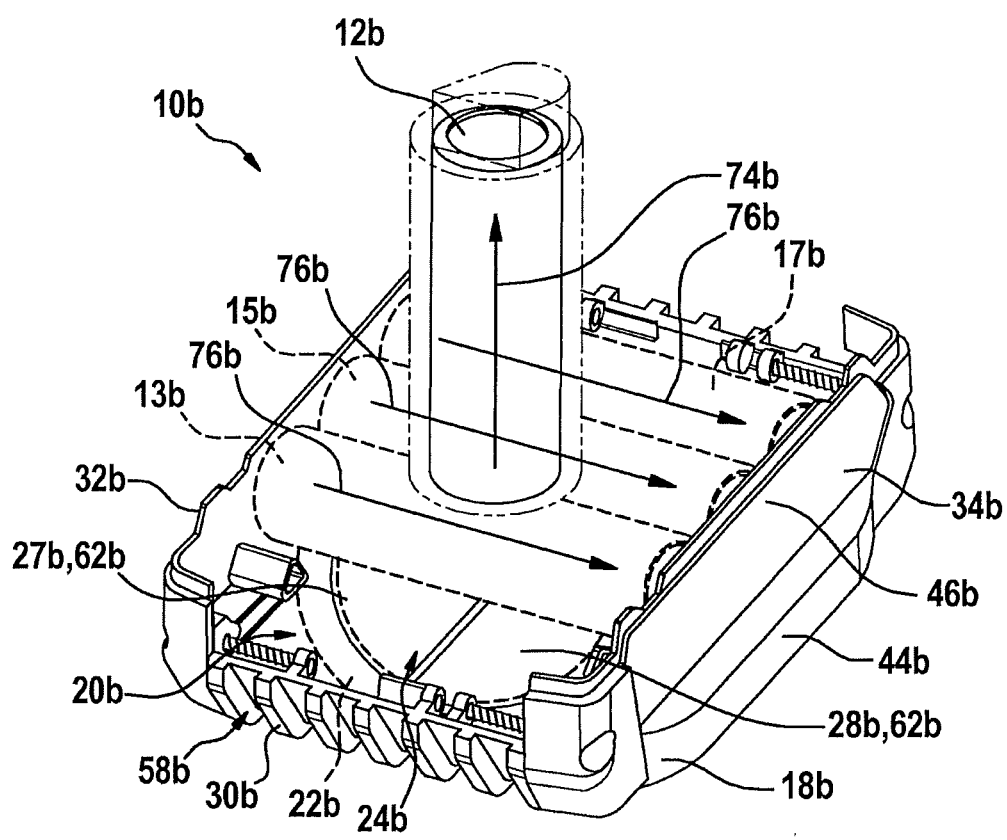
FIG. 14 shows an alternative exemplifying embodiment of a rechargeable handheld tool battery according to the present invention having a single first rechargeable cell.

FIG. 14 shows an alternative exemplifying embodiment of a rechargeable handheld tool battery 10b according to the present invention having a first rechargeable cell 12b, three further rechargeable cells 13b, 15b, 17b, and an inductive charging unit 20b that has an inductive charging coil 22b for charging first rechargeable cell 12 and further rechargeable cells 13b, 15b, 17b, in which first rechargeable cell 12b has a principal extension direction 74b that is oriented perpendicularly to a coil plane of inductive charging unit 20b. The three further rechargeable cells 13b, 15b, 17b have a principal extension direction 76b that proceeds in a coil plane of inductive charging unit 20b. Rechargeable handheld tool battery 10b is embodied analogously to the previous exemplifying embodiment, but has an inductive charging coil 22b having a smaller diameter than in the previous example. Because rechargeable handheld tool battery 10b has a single first rechargeable cell 12b having a principal extension direction 74b proceeding perpendicularly to the coil plane of inductive charging unit 20b, rechargeable handheld tool battery 10b can be inserted into a handle housing having a smaller diameter than rechargeable handheld tool battery 10a depicted in the previous exemplifying embodiment. First rechargeable cell 12b is connected together with further rechargeable cell 13b in a series circuit to yield a first cell block having a total voltage of 7.2 V, and further rechargeable cells 15b, 17b are connected together to yield a second cell block having a total voltage of 7.2 V, which is used to supply electricity after the first cell block has discharged. In principle, rechargeable handheld tool battery 10b can also encompass only a single rechargeable cell 12b, which is indicated by depiction of the further rechargeable cells 13b, 15b, 17b with dashed lines.

Figure 15:
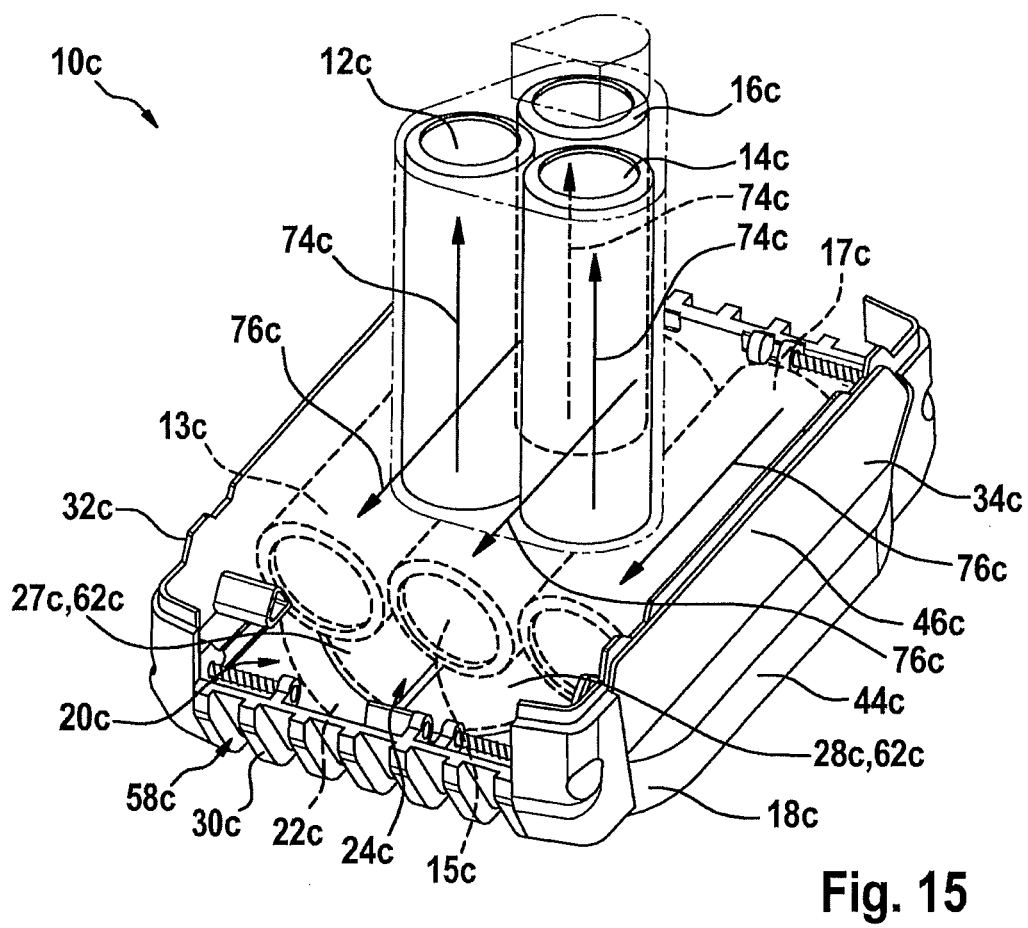
FIG. 15 shows a further alternative exemplifying embodiment of a rechargeable handheld tool battery according to the present invention having three first rechargeable cells that have a principal extension direction that proceeds perpendicularly to a coil plane of an inductive charging unit, and having three further rechargeable cells.

FIG. 15 shows a third exemplifying embodiment of a rechargeable handheld tool battery 10c according to the present invention, having three first rechargeable cells 12c, 14c, 16c and an inductive charging unit 20c that has an inductive charging coil 22c for charging first rechargeable cells 12c, 14c, 16c, in which first rechargeable cells 12c, 14c, 16c have a principal extension direction 74c that is oriented perpendicularly to a coil plane of inductive charging unit 20c. Rechargeable handheld tool battery 10c furthermore has three further rechargeable cells 13c, 15c, 17c having a principal extension direction 76c that is oriented parallel to the coil plane of inductive charging unit 20c. The exemplifying embodiment corresponds largely to the first exemplifying embodiment, except that principal extension direction 76c of the three further rechargeable cells 13c, 15c, 17c of the third exemplifying embodiment proceeds perpendicularly to the principal extension direction 76a of the three further rechargeable cells 13a, 15a, 17a of the first exemplifying embodiment.

Figure 16:
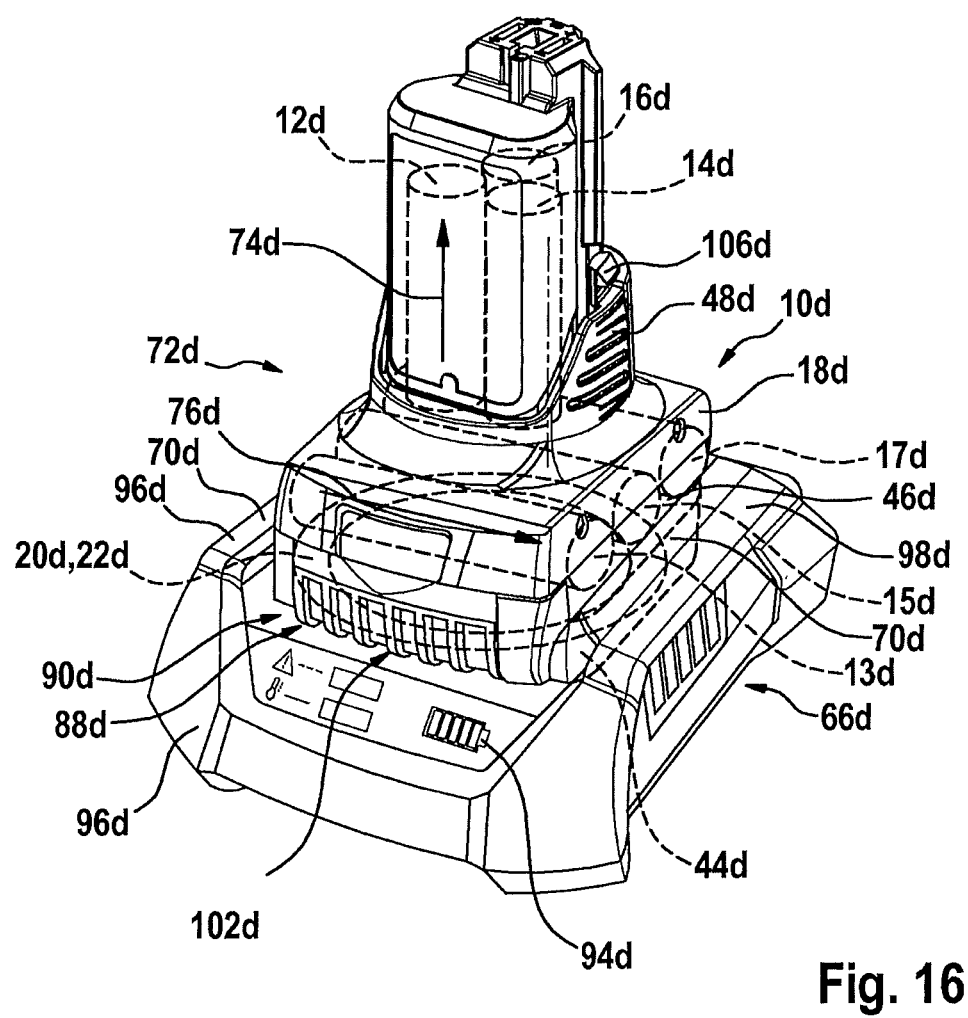
FIG. 16 shows an alternative embodiment of an inductive charging apparatus.
Figure 17A:
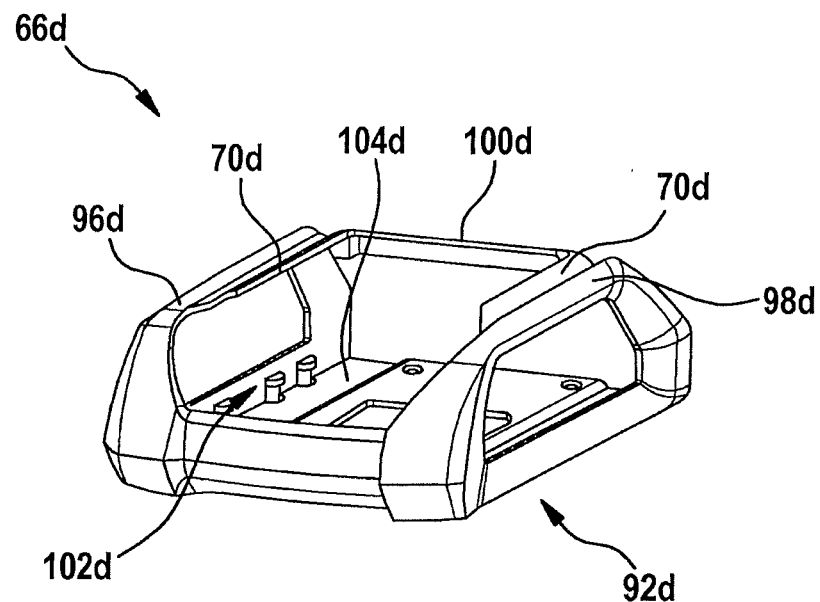
FIG. 17 shows a system made up of the alternatively embodied inductive charging apparatus and a rechargeable handheld tool battery according to the present invention.
Figure 17B:
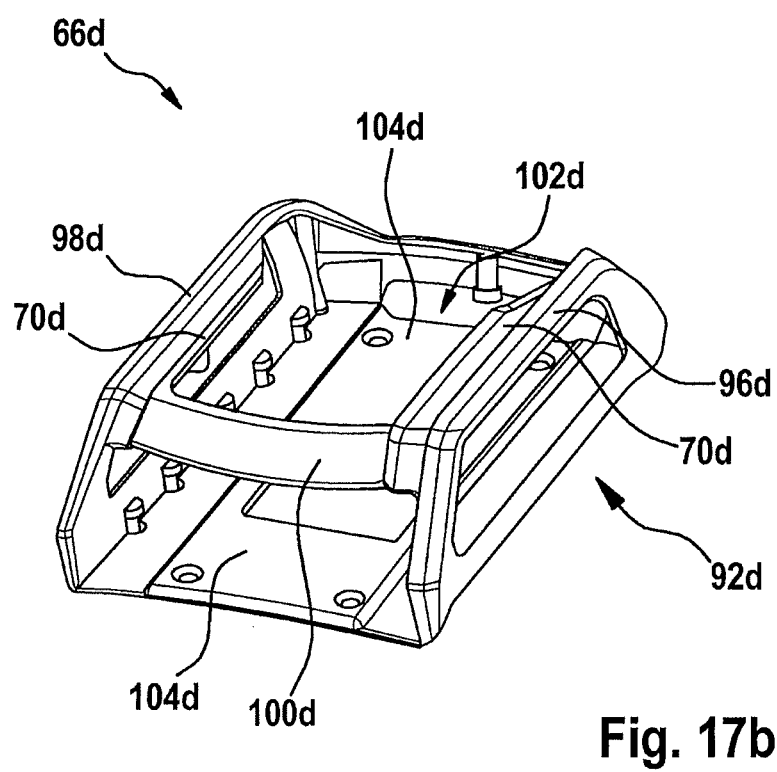

An alternative embodiment of a system 72d having an alternative configuration of an inductive charging apparatus 66d and a rechargeable handheld tool battery 10d is depicted in FIG. 16. Rechargeable handheld tool battery 10d corresponds in its configuration to that of the first exemplifying embodiment. Inductive charging apparatus 66d encompasses an inductive charging device 88d that is embodied substantially analogously to the first exemplifying embodiment, and additionally encompasses a frame 92d that has positive-fit elements 70d of inductive charging apparatus 66a for securing rechargeable handheld tool battery 10d during a charging phase. Frame 92d has a support 104d, constituted by surfaces of frame components, above which rise two lateral brackets 96d, 98d and, on one side, a holding bracket 100d proceeding transversely thereto (FIGS. 17a, 17b). Holding bracket 100d extends from lateral bracket 96d to lateral bracket 98d. Inductive charging device 88d is placed onto support 104d and is then disposed inside frame 92d. Disposed opposite holding bracket 100d is a side of frame 92d which is embodied as a slide-in opening 102d, which is provided for sliding rechargeable handheld tool battery 10d into positive-fit elements 70d and onto placement surface 90d (FIG. 16). Positive-fit elements 70d are provided in order to fit from above around coil receiving region 44d of a battery housing 18d of rechargeable handheld tool battery 10d, which protrudes with respect to a rechargeable cell receiving region 46d, during the charging phase, so that rechargeable handheld tool battery 10d is retained in a position on placement surface 90d. Rechargeable handheld tool battery 10d and inductive charging device 88d of inductive charging apparatus 66d have a pair made up of one positioning recess and one positioning projection, having basic shapes deviating from one another, which are not depicted in FIG. 16 for reasons of perspective. Frame 92d is manufactured from a plastic and is made of two sub-shells that are fixedly connected to one another via screws. It is also conceivable in principle for frame 92d to be embodied as a single solid component.

Figure 18:
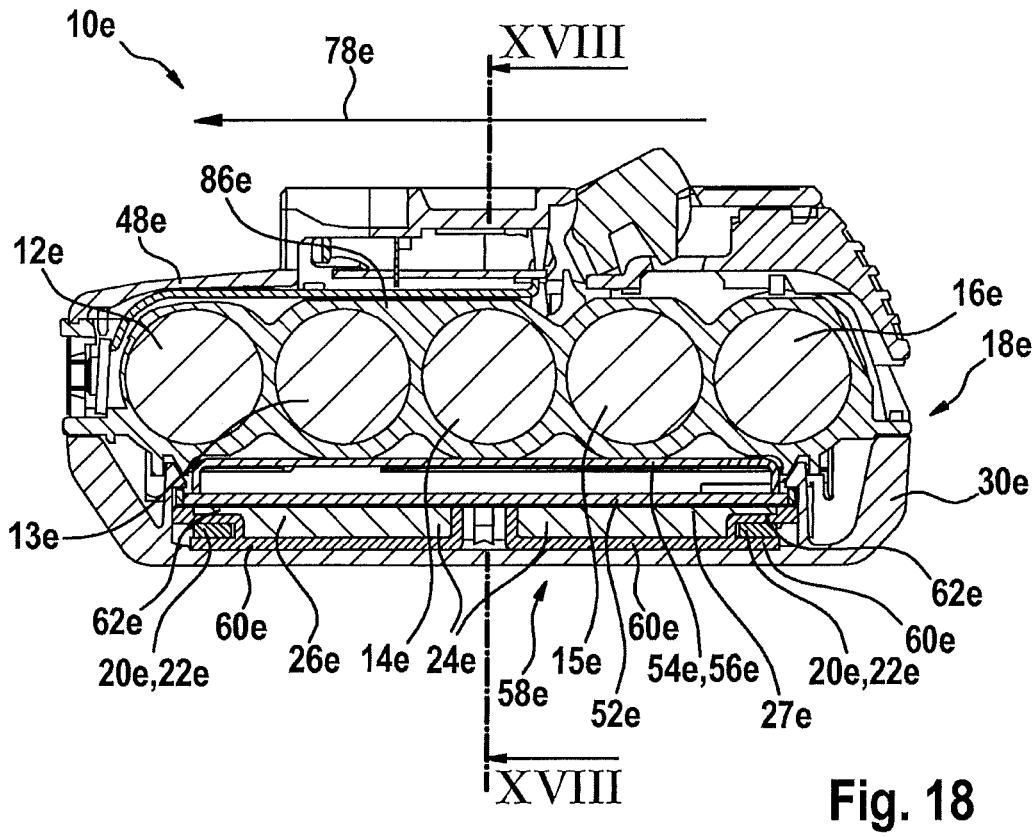
FIG. 18 is a lateral sectioned depiction of a further alternative embodiment of a rechargeable handheld tool battery according to the present invention having five rechargeable cells.
Figure 19:
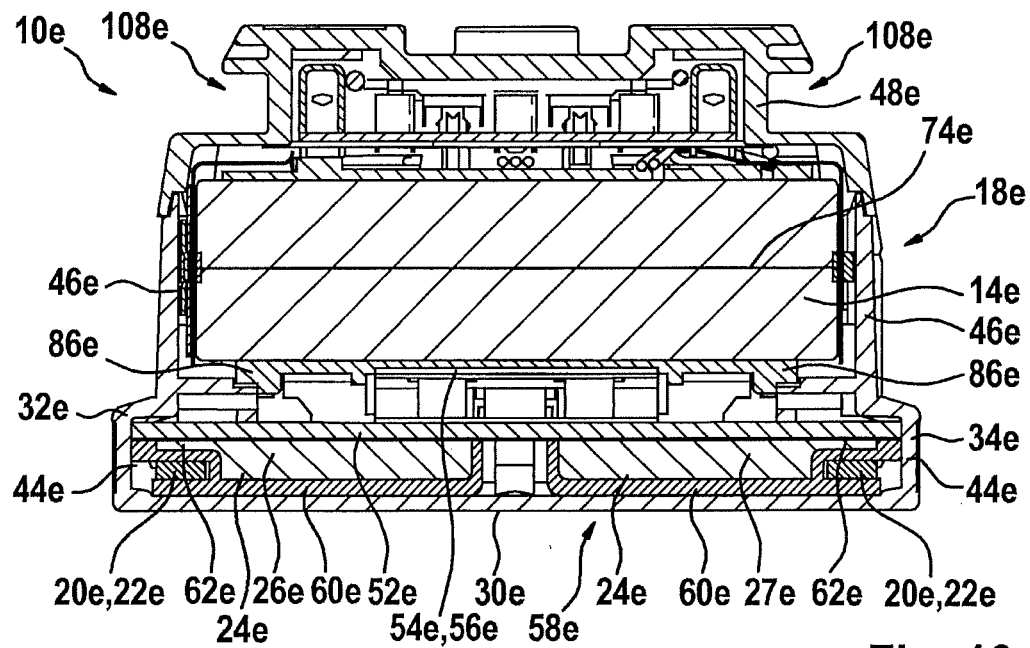
FIG. 19 is a view, perpendicular to the view of FIG. 18, of a lateral section of the rechargeable handheld tool battery of FIG. 18.

FIG. 18 is a side view of a further alternative exemplifying embodiment of a rechargeable handheld tool battery 10e according to the present invention, in a sectioned depiction. Rechargeable handheld tool battery 10e has five rechargeable cells 12e, 13e, 14e, 15e, 16e disposed parallel to one another, and an inductive charging unit 20e that has an inductive charging coil 22e for charging rechargeable cells 12e, 13e, 14e, 15e, 16e. A diameter of inductive charging coil 22e is greater than a principal extension length of rechargeable cells 12e, 13e, 14e, 15e, 16e (FIG. 19). A principal extension direction 74e of rechargeable cells 12e, 13e, 14e, 15e, 16e proceeds transversely to an installation direction 78e of rechargeable handheld tool battery 10e. Installation direction 78e is defined by guidance elements in the form of guidance rails 108e. Installation direction 78e defines a slide-in direction of rechargeable handheld tool battery 10e into a receiving region of a handheld power tool. The receiving region on the handheld power tool for receiving a battery pack by being slid in is embodied at a lower end of a handle of the handheld power tool. Sliding of rechargeable handheld tool battery 10e into the receiving region is accomplished substantially in a direction transverse to the longitudinal extension of the handle. A principal extension direction 74e of rechargeable cells 12e, 13e, 14e, 15e, 16e proceeds transversely to a direction of a principal extension of a central housing component 30e. The five rechargeable cells 12e, 13e, 14e, 15e, 16e are disposed in such a way that ends of rechargeable cells 12e, 13e, 14e, 15e, 16e face toward lateral housing components 32e, 34e. The five rechargeable cells 12e, 13e, 14e, 15e, 16e are connected in series. For a rated voltage of one rechargeable cell of, for example, substantially 3.6 volts, rechargeable handheld tool battery 10e has a rated voltage of substantially 18 volts. Alternatively, only four rechargeable cells disposed in parallel with one another can also be provided. A rechargeable handheld tool battery of this kind has a rated voltage of substantially 14.4 volts. In addition, twice the respective number of rechargeable cells can also be provided, a first rechargeable cell block being constituted from four or five rechargeable cells connected in series, and a second rechargeable cell block being constituted from four or five rechargeable cells connected in series. The first rechargeable cell block and the second rechargeable cell block are connected in parallel. The rechargeable cells are in each case disposed parallel to one another. Each four or five rechargeable cells form a layer of rechargeable cells disposed parallel to one another.

In a further alternative, only three rechargeable cells disposed parallel to one another can also be provided. A rechargeable handheld tool battery of this kind has a rated voltage of substantially 10.8 volts. The three rechargeable cells can also be disposed so that their principal extension direction proceeds parallel to installation direction 78e. The principal extension direction proceeds parallel to the direction of the principal extension of central housing component 30e. This alternative orientation of three rechargeable cells, disposed parallel to one another, relative to the direction of the principal extension of the central housing component is evident from FIG. 15. In FIG. 15, rechargeable cells 13c, 15c, 17c are disposed parallel to the direction of the principal extension of central housing component 30c. Rechargeable handheld tool battery 10c can be equipped without rechargeable cells 12c, 14c, 16c. Housing 18c can be provided with guidance elements in the form of guidance rails, similar to guidance rails 108e depicted in FIG. 19. The guidance rails can proceed parallel to principal extension direction 76c of rechargeable cells 12c, 14c, 16c.

As is evident from FIG. 19, a principal extension direction 74e of rechargeable cells 12e, 13e, 14e, 15e, 16e proceeds transversely to an installation direction 78e of rechargeable handheld tool battery 10e. Installation direction 78e is defined by guidance elements in the form of guidance rails 108e. A principal extension direction 74e of rechargeable cells 12e, 13e, 14e, 15e, 16e proceeds transversely to a direction of a principal extension of a central housing component 30e. The five rechargeable cells 12e, 13e, 14e, 15e, 16e are disposed in such a way that ends of rechargeable cells 12e, 13e, 14e, 15e, 16e face toward lateral housing components 32e, 34e. Rechargeable cells 12e, 13e, 14e, 15e, 16e are disposed one behind another, with no offset, along the direction of the principal extension of central housing component 30e and in a direction perpendicular to the direction of the principal extension of central housing component 30e. In principle, rechargeable cells 12e, 13e, 14e, 15e, 16e can also be disposed with an offset in the direction perpendicular to the direction of the principal extension of central housing component 30e.

Rechargeable handheld tool battery 10e has an installation direction 78e, for installation of rechargeable handheld tool battery 10e onto a handheld power tool, which proceeds substantially parallel to a coil plane of inductive charging unit 20e. Installation direction 78e proceeds perpendicularly to principal extension direction 74e of rechargeable cells 12e, 13e, 14e, 15e, 16e. In the alternative case where rechargeable cells 12e, 13e, 14e, 15e, 16e are disposed with principal extension direction 74e parallel to the direction of the principal extension of central housing component 30e, installation direction 78e proceeds parallel to principal extension direction 74e of rechargeable cells 12e, 13e, 14e, 15e, 16e. For insertion into the handheld power tool, rechargeable handheld tool battery 10e has guidance rails 108e that proceed in installation direction 78e. Guidance rails 108e interact, upon installation, with guidance elements of the handheld power tool. Alternatively, guidance rails 108e can also be used for securing onto a positive-fit element 70d of an inductive charging device 88d, in accordance with the previous exemplifying embodiment. Rechargeable handheld tool battery 10e is secured without tools on the handheld power tool with a sliding-in motion, and is detachable from the handheld power tool without tools by way of release means (not depicted). A rechargeable cell carrier 86e having five receiving spaces surrounds rechargeable cells 12e, 13e, 14e, 15e, 16e and retains them in a relative position inside rechargeable handheld tool battery 10e. A heat distribution element 54e having a thermal conduction coating 56e made of aluminum is in contact with rechargeable cell carrier 88e and with a charging electronics system 52e, and is provided in order to distribute waste heat of charging electronics system 52e during charging of rechargeable handheld tool battery 10e, and waste heat of rechargeable cells 12e, 13e, 14e, 15e, 16e upon discharge of rechargeable handheld tool battery 10e.

What is claimed is:

1. A rechargeable handheld tool battery, comprising:
   at least one rechargeable cell; and
   at least one inductive charging unit that has at least one inductive charging coil for charging the at least one rechargeable cell, wherein a diameter of the inductive charging coil is greater than a principal extension length of the at least one rechargeable cell,
   wherein the at least one rechargeable cell has a principal extension direction that is oriented parallel to a coil plane of the at least one inductive charging unit,
   wherein the inductive charging unit has a coil core unit having a plate region which shields the at least one rechargeable cell at least in part with respect to the inductive charging coil, wherein the plate region is a planar region of the coil core unit,
   wherein the plate region has at least one axial length that is (i) shorter than the diameter of the inductive charging coil and (ii) shields the at least one rechargeable cell at least in part with respect to the inductive charging coil.

2. The rechargeable handheld tool battery as recited in claim 1, further comprising:
   a battery housing having a coil receiving region for receiving the inductive charging coil, the coil receiving region forming at least in part a positive-fit element.

3. The rechargeable handheld tool battery as recited in claim 2, wherein the battery housing has a rechargeable cell receiving region for receiving the at least one rechargeable cell, the rechargeable cell receiving region being set back relative to the coil receiving region.

4. The rechargeable handheld tool battery as recited in claim 1, wherein the plate region is of at least substantially rectangular configuration.

5. The rechargeable handheld tool battery as recited in claim 1, wherein the coil core unit has multiple separate core pieces.

6. The rechargeable handheld tool battery as recited in claim 3, further comprising:
   at least one heat distribution element provided to distribute a waste heat.

7. The rechargeable handheld tool battery as recited in claim 6, wherein the heat distribution element has at least one thermal conduction coating.

8. The rechargeable handheld tool battery as recited in claim 3, wherein at least the inductive charging unit is embodied as a preassembled module.

9. The rechargeable handheld tool battery as recited in claim 3, wherein an installation direction for installation of the rechargeable handheld tool battery on a handheld power tool extends at least substantially parallel to the coil plane of the inductive charging unit.

10. The rechargeable handheld tool battery as recited in claim 3, wherein the rechargeable handheld tool battery is part of a system which further includes a handheld power tool.

11. The rechargeable handheld tool battery as recited in claim 10, wherein with the handheld power tool and the rechargeable handheld tool battery in an assembled state, the at least one rechargeable cell is at least substantially surrounded by a handle housing.

12. The rechargeable handheld tool battery as recited in claim 3, wherein the rechargeable handheld tool battery is part of a system which further includes an inductive charging apparatus.

13. The rechargeable handheld tool battery as recited in claim 12, wherein the inductive charging apparatus has positive-fit elements for securing the rechargeable handheld tool battery during a charging phase.

14. The rechargeable handheld tool battery as recited in claim 13, wherein the inductive charging apparatus and the rechargeable handheld tool battery have a positioning protrusion and a positioning recess having basic shapes differing from one another.

15. A rechargeable handheld tool battery, comprising:
at least one rechargeable cell; and
at least one inductive charging unit that has at least one inductive charging coil for charging the at least one rechargeable cell, wherein a diameter of the inductive charging coil is greater than a principal extension length of the at least one rechargeable cell,
wherein the inductive charging unit has a coil core unit having a plate region which shields the at least one rechargeable cell at least in part with respect to the inductive charging coil, wherein the plate region is a planar region of the coil core unit,
wherein the plate region has at least one axial length that is (i) shorter than the diameter of the inductive charging coil and (ii) shields the at least one rechargeable cell at least in part with respect to the inductive charging coil.

* * * * *